US008137440B2

(12) United States Patent
Dewald, III et al.

(10) Patent No.: US 8,137,440 B2

(45) Date of Patent: Mar. 20, 2012

(54) DRYER HAVING STRUCTURE FOR ENHANCED DRYING AND METHOD OF USE

(75) Inventors: Charles Robert Dewald, III, Morristown, TN (US); Thomas L. Cristello, West Orange, NJ (US)

(73) Assignee: Protégé Enterprises, Union, NJ (US)

( * ) Notice: Subject to any disclaimer, the term of this patent is extended or adjusted under 35 U.S.C. 154(b) by 162 days.

(21) Appl. No.: 12/073,991

(22) Filed: Mar. 12, 2008

(65) Prior Publication Data

US 2008/0276484 A1 Nov. 13, 2008

Related U.S. Application Data

(63) Continuation-in-part of application No. 11/797,941, filed on May 9, 2007, now Pat. No. 7,785,398.

(51) Int. Cl.
*B01D 53/02* (2006.01)

(52) U.S. Cl. ................ 95/113; 95/106; 95/134; 95/146; 34/77; 34/80; 34/86; 34/472; 34/473

(58) Field of Classification Search .................... 95/106, 95/113, 134, 146; 34/77, 80, 86, 472, 473
See application file for complete search history.

(56) References Cited

U.S. PATENT DOCUMENTS 2,186,844 A * 1/1940 Smith .............................. 62/94
2,700,537 A * 1/1955 Pennington ..................... 261/83
2,926,502 A * 3/1960 Munters et al. ................... 62/94
3,398,510 A * 8/1968 Pennington ..................... 96/115
4,180,985 A * 1/1980 Northrup, Jr. ..................... 62/94
4,594,860 A * 6/1986 Coellner et al. ................ 96/118
4,982,575 A * 1/1991 Besik .............................. 62/271
5,172,489 A * 12/1992 Moller ............................ 34/472
5,343,632 A * 9/1994 Dinh .............................. 34/507
5,353,606 A * 10/1994 Yoho et al. ...................... 62/271
5,502,975 A * 4/1996 Brickley et al. .................. 62/94
5,517,828 A * 5/1996 Calton et al. .................... 62/271
5,937,667 A * 8/1999 Yoho, Sr. ........................ 62/271
6,094,835 A 8/2000 Cromer
6,178,762 B1 * 1/2001 Flax ............................... 62/271
(Continued)

FOREIGN PATENT DOCUMENTS

GB 2 217 824 A 11/1989
(Continued)

OTHER PUBLICATIONS

International Search Report, dated Jul. 15, 2008.

*Primary Examiner* — Robert J Hill, Jr.
*Assistant Examiner* — Christopher P Jones
(74) *Attorney, Agent, or Firm* — Nixon IP Law, PLC; William F. Nixon

(57) ABSTRACT

A dryer and a drying apparatus attachable to a dryer are disclosed. A wheel having desiccant material is located in line and in close proximity with a heating element. The wheel includes a first portion positioned in an inlet air path and a second portion positioned in an outlet air path. The desiccant material removes water molecules from air within the inlet air path, and lowers the vapor pressure of the incoming air. In the outlet air path, heated air flows through the second portion to transfer energy to the desiccant material. The wheel rotates to change the desiccant material within the portions.

12 Claims, 3 Drawing Sheets

U.S. PATENT DOCUMENTS

| | | | | |
|---|---|---|---|---|
| 6,328,095 | B1 * | 12/2001 | Felber et al. | 165/54 |
| 6,355,091 | B1 * | 3/2002 | Felber et al. | 95/10 |
| 6,575,228 | B1 * | 6/2003 | Ragland et al. | 165/54 |
| 6,751,964 | B2 * | 6/2004 | Fischer | 62/94 |
| 6,780,227 | B2 * | 8/2004 | DuBose et al. | 96/125 |
| 6,959,875 | B2 * | 11/2005 | Yabu et al. | 236/44 C |
| 7,166,149 | B2 * | 1/2007 | Dunne et al. | 95/113 |
| 7,886,986 | B2 * | 2/2011 | Fischer et al. | 236/49.3 |
| 2003/0164091 | A1 * | 9/2003 | Hill et al. | 95/90 |
| 2005/0150378 | A1 * | 7/2005 | Dunne et al. | 95/113 |
| 2007/0028769 | A1 * | 2/2007 | Eplee et al. | 95/113 |
| 2008/0276802 | A1 * | 11/2008 | Dewald et al. | 95/106 |
| 2009/0205220 | A1 * | 8/2009 | Dewald et al. | 34/513 |

FOREIGN PATENT DOCUMENTS

| | | | |
|---|---|---|---|
| GB | 2 369 422 | A | 5/2002 |
| JP | 2007 222455 | | 9/2007 |
| WO | WO 93/21489 | | 10/1993 |
| WO | WO 2005/012624 | | 2/2005 |
| WO | WO 2006/062262 | A1 | 6/2006 |
| WO | WO 2007/094741 | A1 | 8/2007 |

* cited by examiner

DRYER HAVING STRUCTURE FOR ENHANCED DRYING AND METHOD OF USE

This application is a Continuation-in-Part of U.S. patent application Ser. No. 11/797,941, filed on May 9, 2007, which issued as U.S. Pat. No. 7,785,398 B2, on Aug. 31, 2010 and is incorporated herein by reference.

FIELD OF THE INVENTION

The present invention relates to a dryer using heated air to dry items. More particularly, the present invention relates to a dryer a structure to enhance moisture removal from the items in the dryer. The present invention improves drying efficiency using the structure.

DISCUSSION OF THE RELATED ART

Clothes dryers basically work in the following manner. The dryer sucks in air from the surrounding area. The dryer heats the air using an electric heating element, a gas burner and the like. The air passes into a tumbler housed within the dryer once it is heated. The hot air evaporates water from the clothes as they spin inside the tumbler. The dryer then forces the water evaporated from the clothes along with the hot air outside its assembly. Typically, a vent allows the air and moisture to exit the room.

Articles, such as clothes, towels, rugs and the like, take a certain amount of time to dry. The amount of time varies according to the article being dried. Other factors to this time period are energy capacity of the heating element, efficiency of heat transfer, air flow capacity, vapor pressure and the like. Some of these factors may be beyond the control of the dryer, while others may be controlled or monitored to improved drying times and efficiency.

Dryers use the vapor pressure of the air in the home, laundry room, basement and the like, which can be less than desirable for drying articles. The grains of moisture in a home may range from about 45 to about 110 grains of water vapor per pound of air. Grains of water vapor per pound of air (grains/lb) indicate the density measurement of water vapor in air. For example, 14 cubic feet of air is about 1 pound (lb) of air. Approximately 7000 grains of water vapor are in about one lb of air. By measuring the volume of air, an average number of grains of water vapor for the volume may be determined.

The air sucked into the dryer is heated during the time period for drying the articles. The higher the grains/lb of water in the air, the longer the drying period. For example, air having about 110 grains/lb. may take twice as long as air having about 45 grains/lb. Thus, conditions for drying may be less than optimal when using damp air surrounding the dryer.

SUMMARY OF THE INVENTION

The disclosed embodiments of the present invention relate to a dryer apparatus that improves drying efficiency and reduces the amount of time needed to dry articles. The dryer removes moisture from the air prior to entering the drum, tumbler or housing with the dryer that holds the articles. The disclosed embodiments of the present invention seek to improve the condition of the air moisture prior to drying.

If the grains per pound of water vapor of the air to be heated are low, then the articles within the dryer are dried faster. The relationship is established because the vapor pressure is reduced, which results in a quicker drying period. Thus, the time and energy to dry an article is reduced. Preferably, a grain count of about 10 to 40 grains/lb reduces the drying period to about a third of the normal drying period.

Vapor pressure dictates how much energy is needed to evaporate the water from the drying article. A certain amount of energy, such as about 1060 British Thermal Units (Btus), is needed to evaporate 1 pound of air. Reducing the vapor pressure in that air would reduce the amount of energy needed to evaporate the pound of air. Vapor pressure may vary according to location and other conditions, but it can almost always be reduced to a lower value. The disclosed embodiments of the present invention relates to reducing the vapor pressure in air so as to generate better air for drying clothes and lower costs. Thus, the disclosed embodiments of the present invention reduces the grains/lb of the air flowing into the dryer from the outside to improve drying times and efficiency.

The disclosed embodiments of the present invention achieve improved drying efficiency by using an intake to suck in air separate from the inlet air path of the dryer. In other words, air enters the dryer from two different locations. One air stream goes through the dryer as normal, while the other flows through a heating element. Both streams flow through a wheel that removes water from the water, except the heated air serves to regenerate the desiccant material within the wheel. Thus, the desiccant material held by the wheel is dried before being placed back into the path of the inlet air going into the drum of the dryer.

Orientation of the airstreams according to the disclosed embodiments helps in the elimination of lint from the dryer. Lint may reduce drying efficiency within the dryer by reducing the removal of moisture from the air entering the dryer. Further, the disclosed embodiments disclose a structure that places a heating element where it can do the most good in the dryer. The disclosed configuration also reduces the vapor pressure of the air used for regeneration within the dryer.

According to the disclosed embodiments, a dryer is disclosed. The dryer includes an inlet air path. The dryer also includes a heating element to heat an intake air stream separate from the inlet air path. The dryer also includes a wheel positioned to receive air from the inlet air path and heated air in the intake air stream. The wheel includes desiccant material. The dryer also includes an outlet air path to combine the heated air in the intake air stream with an outlet air stream.

Further according to the disclosed embodiments, another dryer is disclosed. The dryer includes a desiccant wheel regeneration system that dries a desiccant material within the desiccant wheel including an air intake to allow an intake air stream to flow through a heating element to generate heated air that dries the desiccant material and then combines with air expelled from the dryer.

Further according to the disclosed embodiments, a method for drying an article is disclosed. The method includes creating an intake air stream separate from an inlet air path. The method also includes heating air within the intake air stream. The method also includes flowing the heated air through a wheel including desiccant material. The method also includes removing at least one water molecule from air within the inlet air path with the desiccant material.

Further according to the disclosed embodiments, a dryer is disclosed. The dryer includes an intake located on a side of the dryer to allow intake air to enter the dryer and heated with a heating element. The dryer also includes a fan positioned with the intake to draw the intake air into the dryer.

Further according to the disclosed embodiments, a method for regenerating a desiccant wheel in a dryer also is disclosed. The method includes creating an intake air stream through an intake. The method also includes heating the intake air stream. The method also includes flowing the intake air stream through a portion of desiccant material. The method also includes combining the intake air stream with an outlet air path.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

DETAILED DESCRIPTION OF THE PREFERRED EMBODIMENTS

Figure 1:
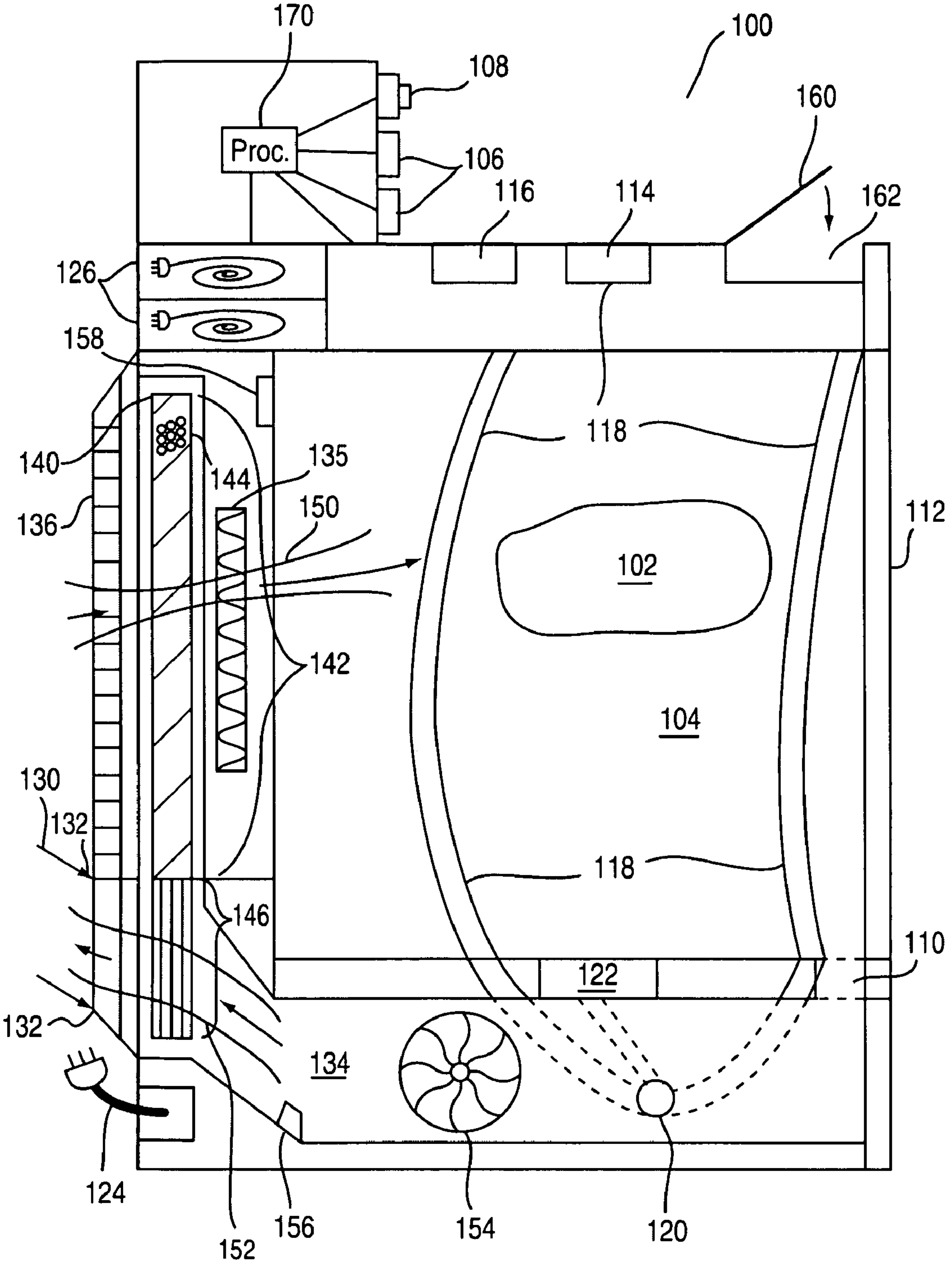
FIG. 1 illustrates a dryer having a desiccant wheel according to the disclosed embodiments.

Aspects of the invention are disclosed in the accompanying description. Alternate embodiments of the present invention and their equivalents are devised without parting from the spirit or scope of the present invention. It should be noted that like elements disclosed below are indicated by like reference numbers in the drawings.

FIG. 1 depicts a dryer 100 having a desiccant wheel 140 according to the disclosed embodiments. Dryer 100 is a dryer using forced, heated air to remove moisture and wetness from articles, such as clothes, towels, fabric, dishes, household items, and the like. Article 102 represents one of such articles, or a plurality of articles, within dryer 100. Preferably, article 102 is contained, or held, within a rotating drum 104. Article 102 tumbles within drum 104 to allow the heated air to flow over its surface to remove moisture.

Dryer 100 intakes outside air from its surrounding environment and expels the air after it has cycled through drum 104. This process is disclosed in greater detail below. Dryer 100 also includes controls 106 to adjust settings and operations for drying articles. Controls 106 may be knobs, buttons, displays, and the like. Indicator 108 alerts a user that lint screen 110 should be cleaned. Preferably, indicator 108 is a light that comes on to alert the user.

Dryer 100 also includes door 112. FIG. 1 shows door 112 on the front side of dryer 100, but door 100 may be placed on any side or surface of dryer 100. For example, door 112 may be located on the top of dryer 100 if that side is considered more convenient or accessible. Drum 104 holds articles 102. Article 102 is placed into and removed from drum 104 via door 112. Thermostat 114 controls the temperature in drum 104 and uses information provided by sensor 116 to determine whether to increase or decrease the amount of heated air forced onto article 102.

Belts 118 rotate drum 104. Although FIG. 1 shows two belts, the number of belts may vary according to the needs and size of dryer 100. Moreover, other means for rotating drum 104 can be employed and dryer 100 is not limited to using belts. Belts 118 may be attached to a rotor 120. Rotor 120 is controlled by motor 122, which receives commands set by controls 106. Again, rotor 120 and motor 122 may be any configuration or type commonly used in dryers.

Power to dryer 100 is provided via power cord 124. Preferably, power cord 124 includes a 220 volt plug that interacts with a wall outlet. Alternatively, power may be supplied through two 110 volt plugs 126 stored within dryer 100. Plugs 126 provide an alternate power source should the 220 volt plug be unavailable.

Dryer duct 130 couples vent 134 of dryer 100 to the outside. Preferably, duct 130 connects to a vent within a wall. Duct 130 is coupled to dryer 100 using clips 132. Duct 130 may be comprised of rigid material that does not collapse during common use. The rigidity ensures that good air flow occurs at all times while dryer 100 is in use.

Lint screen 110 separates drum 104 from vent 134. Vent 134 allows air from drum 104 to exit dryer 100 through duct 130. Fan 154 draws air filled with moisture from article 102 into vent 134. If the air is saturated with moisture, then the removal of moisture from article 102 is compromised. Fan 154 sucks the air through lint screen 110, which removes dirt, fluff and other materials from the air so that vent 134 does not become clogged.

Dryer 100 also includes vents 136 that allow air to flow into drum 104. Vents 136 may use small openings to keep foreign objects and materials out of dryer 100. Wheel 140 is placed between vents 136 and drum 104. Heating element 135 heats the air as it enters drum 104 in order to dry article 102. Heating element 135 may be a heater or other device known in the art for heating forced air. Heating element 135 also may be referred to as the primary heating element of dryer 100. Temperatures attainable by heating element 135 may vary according to the desired operation of dryer 100, and may vary as set by controls 106.

Wheel 140 includes compartments filled with silica gel pellets 144. Alternatively, other silica gel products may be used in conjunction with wheel 140. Further, other desiccants may be used with wheel 140. Silica gel pellets 144 act like salt in removing water or moisture from incoming air. The removal, in turn, reduces the vapor pressure of the incoming air, which increases the drying capability of the air. Each pellet includes a strong positive end and strong negative end in its silica molecules. Because the water molecule also acts like a polar molecule, the water in the incoming air is attracted chemically to the silica gel. Thus, the grains of water vapor are reduced in the volume of air coming into dryer 100.

The air flows through wheel 140 at portion 142. Portion 142 includes those parts of wheel 140 having silica gel pellets 144 that remove water from air. Because some of the water vapor of the incoming air will attach to pellets 144, the air flowing into drum 104 is lower in vapor pressure to dry article 102 in a more efficient and timely manner. Conventional clothes dryers use the vapor pressure of the air outside dryer 100, which may not be very suitable for drying articles, such as clothes or towels. The moisture of air within a home, for example, may range from 45 to 110 grains/lb. The vapor pressure of the air being sucked into dryer 100 for heating by heating element 135 determines the time period for article 102 to dry. For example, air having vapor pressure of 110 grains/lb will not dry article 102 as fast as would air having grains of less than 45 grains/lb.

If the vapor pressure of the incoming air is reduced, then article 102 dries faster. The drying process consumes fewer resources because less energy is needed to evaporate water from article 102. For example, if the vapor pressure of the incoming air is reduced down to about 10 to 40 grains/lb, then article 102 would have a reduced average drying time. Thus, less energy needs to be supplied to heating element 135 and less power to rotate drum 104 according to the disclosed embodiments.

As shown in FIG. 1, portion 142 of wheel 140 is positioned to receive the incoming air shown by inlet air path 150. Inlet air path 150 represents all the incoming air through vents 136.

Inlet air path 150 also includes air from other parts of dryer 100, such as the front or sides, and is not limited to air flowing through vents 136. Inlet air path 150 also flows through portion 142 and heating element 135 into drum 104.

The air within inlet air path 150 reacts with pellets 144 housed in wheel 140 to remove moisture and water vapor, which, in turn, lowers the vapor pressure of the air prior to heating. Portion 142 houses these pellets. Preferably, portion 142 takes up over half the area of wheel 140 so that most of pellets 144 are reacting with the incoming air. More preferably, portion 142 represents about three quarters (¾) of the surface area of wheel 140.

Portion 146 of wheel 140 is positioned by vent 134 to be exposed to air flowing from drum 104 to duct 130. Outlet air path 152 represents the air expelled from drum 104 via vent 134. Outlet air path 152 flows through portion 146. Preferably, portion 146 is a lower part of wheel 140.

The air within outlet air path 152 may regenerate pellets 144 within portion 146. The pellets within portion 146 absorb the heat from outlet air path. Outlet air path 152 includes an air stream with hot air that flowed through heating element 135 and drum 104. Outlet air path 152 burns off water vapor from pellets 144 within portion 146 that was absorbed in portion 142 from the air in inlet air path 150. The hot air breaks the polar bond attraction between the silica pellet and water vapor molecule. Thus, outlet air path 152 dries out portion 142 of wheel 140. By doing this procedure, pellets 144 can absorb more water vapor when they are moved back to position 142.

The desiccant used within wheel 140 also adds to the efficiency of the drying process by recouping or retaining heat within wheel 140. A percentage of the hot air stream of outlet air path 152 used to burn water off pellets 144 in portion 146 is retained or stored in those pellets, which reacts with the air of inlet air path 150 going through portion 142 prior to flowing through heating element 135. Thus, the disclosed embodiments deliver air having reduced vapor pressure to article 102 in drum 104 to evaporate more water or moisture.

Dryer 100 also includes sensors or other information gathering devices to indicate temperatures, vapor pressure, parameter status, air flow and the like. This information may be forwarded to a processor 170. Processor 170 controls operations of dryer 100 and is coupled to controls 106 and other features. Processor 170 may execute steps or commands within a memory coupled to the processor.

Sensor 158 may be located in the vicinity of inlet air path 150 to determine the temperature of air flowing into drum 104. Based on the need of drum 104, processor 170 can adjust heating element 135 to a desired temperature so that the air in inlet air path 150 enters drum 104 at the desired temperature. Sensor 158 also may detect moisture in the air of inlet air path 150 to determine whether wheel 140 is absorbing water vapor from inlet air path 150.

For example, sensor 158 detects a high level of vapor pressure, or a large amount of moisture, in the incoming air, and this indicates more water vapor in the air than desired. Thus, processor 170 commands wheel 140 to turn to place the saturated pellets 144 into portion 146 for reducing the vapor pressure. Pellets 144 that are located in portion 146 are moved to portion 142 because they are dried out and more absorbent than those pellets in use. The move to position 142 allows the dry pellets to absorb the moisture from air within inlet air path 150. Wheel 140 may be turned using a rotor coupled to a motor or power source that rotates an attached belt. This feature of the present invention is disclosed in greater detail below.

Sensors may also determine status for other areas, such as door 112 being opened. The sensors may comprise any known device used to determine temperature, vapor pressure or other parameters from an environment, especially air. In a basic configuration, sensors 156 and 158 are thermometers that simply relay a temperature reading. Alternatively, sensors 156 and 158 determine vapor pressure, air speed, humidity, force and the like of the air flowing over the respective sensor. Sensors 156 and 158 provide valuable feedback on operating dryer 100 and preventing injury to a user or article. A blast of hot air through door 112 could harm a user, as well as ruining article 102 due to overexposure to heated air.

For example, sensor 158 could indicate a start time to processor 170 for drum 104 to operate. After the time period, sensor 158 takes a reading at inlet air path 150 to make sure heating element 135 and dryer 100 are operating correctly. Sensor 156 is located in vent 134 and may serve the same purposes as sensor 158 by detecting vapor pressure, temperatures, air flow and the like. Sensor 156 may determine the vapor pressure or moisture in the outgoing air, and if it is saturated. If the air includes too much moisture or a high level of vapor pressure, then settings to dryer 100 and, specifically, wheel 140 may be adjusted accordingly.

Dryer 100 also includes a small door 160 to opening 162. Opening 162 accommodates dryer sheets, fabric softener, detergent, and the like placed into drum 104.

Figure 2:
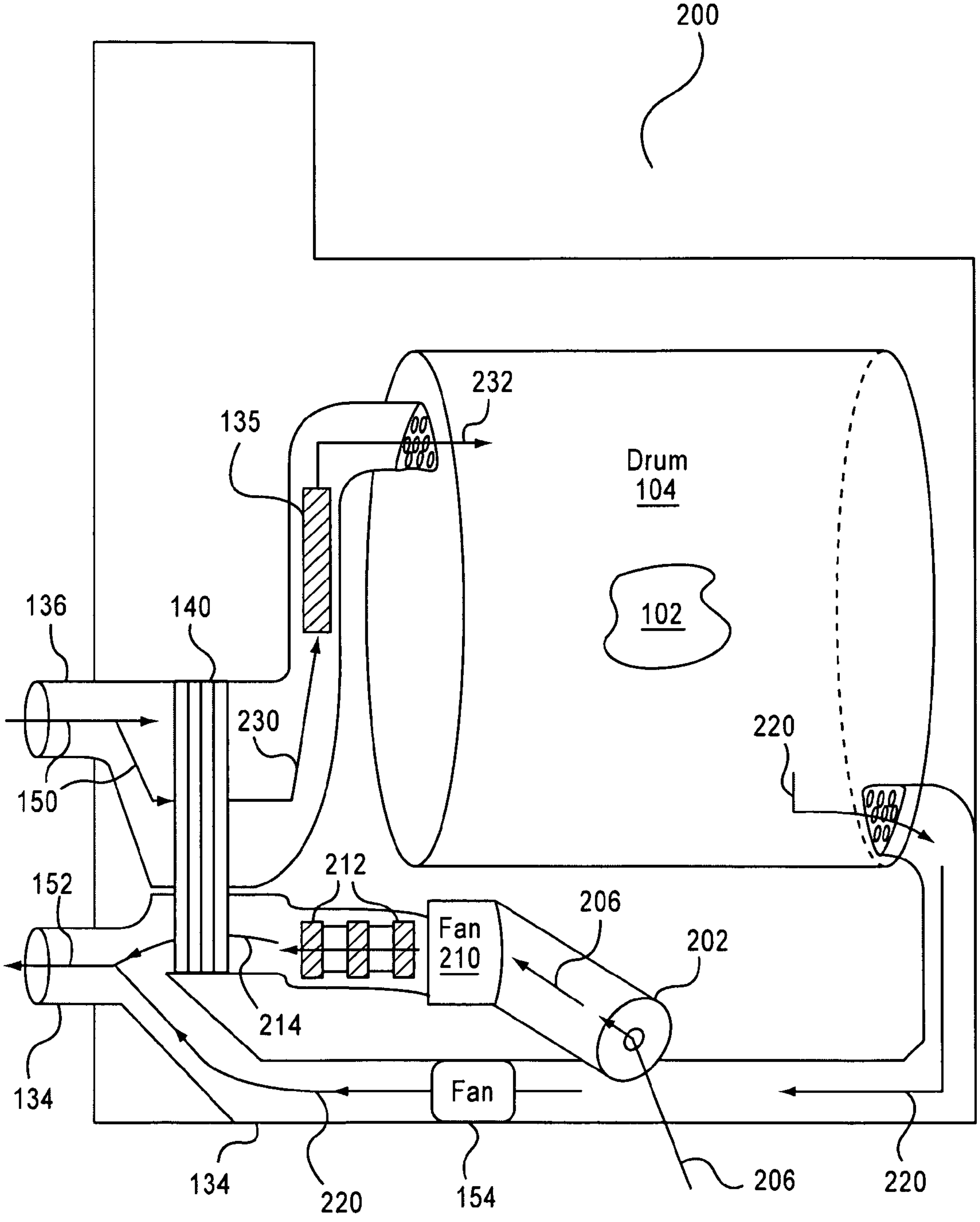
FIG. 2 illustrates another dryer having a desiccant wheel according to the disclosed embodiments.

FIG. 2 depicts another dryer 200 having a different configuration incorporating desiccant wheel 140 according to the disclosed embodiments. Desiccant wheel 140 is similar to the wheel disclosed above, but is shown in dryer 200, which is configured differently than dryer 100 of FIG. 1. Thus, desiccant wheel 140 performs the same function as disclosed above in removing moisture from incoming air and lower the vapor pressure of air entering dryer 200. In this configuration, however, the lower part of wheel 140 receives hot air from heating element 212 instead of moist warm air within an outlet air path. Unless otherwise indicated, dryer 200 includes the same components as dryer 100 disclosed above.

Dryer 200 differs from dryer 100 in several ways. For example, dryer 200 includes an incoming intake air stream 206 that flows into air intake 202. Preferably, air intake 202 is located on the side of dryer 200, and away from vents 136 that brings in inlet air path 150. Air intake 202 may be any passage that allows air into dryer 200, preferably with a screen or filter to keep out dust and debris. Once inside air intake 202, air stream 206 is pulled by intake fan 210 to heating element 212. Fan 210 is placed in dryer 200 in addition to fan 154. Preferably, fan 210 is about $\frac{1}{4}^{th}$ to $\frac{1}{3}^{rd}$ the size of fan 154. Fans 154 and 210 may draw power from the same source.

Heating element 212 applies heat to intake air stream 206 to generate heated air stream 214. Heated air stream 214 flows through desiccant wheel 140. The hot air of heated air stream 214 regenerates desiccant wheel 140. Thus, dryer 200 differs from dryer 100 in that the moist, warm air from drum 104 is diverted to the outside through vent 134 and not to desiccant wheel 140. Instead, drier, heated air in the form of heated air stream 214 is applied to desiccant wheel 140. The heated air in air stream 214 removes moisture from, for example, the pellets in desiccant wheel 140. The energy in the heated air is used to break the bonds of the water molecules from the desiccant material within wheel 140. As desiccant wheel 140 rotates back into position with inlet air path 150, its pellets are more moisture absorbent because the heated air from heating element 212 dried the pellets.

After flowing through desiccant wheel 140, heated air stream 214 joins an outlet air stream within outlet air path 152. As disclosed above, outlet air path 152 carries moisture and air from article 102 and drum 104 to the outside. Moist heated air stream 220 flows into vent 134. Fan 154 draws air stream 220 through vent 134. Air stream 220 merges with the air coming from the regeneration of desiccant wheel 140, or air stream 214. Thus, the air streams for of drying article 102 and regenerating desiccant wheel 140 are kept separate from any intake air heading towards heating element 135. This configuration results in enhanced drying efficiency for dryer 200.

By orienting the air streams as shown in FIG. 2, dryer 200 may eliminate lint flowing through desiccant wheel 140. Lint going through desiccant wheel 140 would reduce efficiency of absorbing moisture from the air in inlet air path 150 that becomes air stream 230 flowing into heating element 135. In this embodiment, lint within air stream 220 goes into outlet air path 152 and bypasses desiccant wheel 140. This configuration prevents lint from entering the pellets or other water-absorbent material within wheel 140.

By separating heating element 212 and heating element 135, dryer 200 places the heat and energy in the position to result in a more efficient process without increasing heating capacity. For example, a standard heating element having a capability of about 17,000-22,000 British thermal unit/hour (Btu/hr) may be split into two parts. The majority of the total heating capacity of about 12,000-16,000 Btu/hr will stay in the air stream going into drum 104, or air stream 232. A small portion of the heating capacity of around 5,000-6,000 Btu/hr will be used to regenerate desiccant wheel 140 as shown by heating element 212. The higher the temperature to regenerate wheel 140, then the better the conditions for drying article 102.

The creation of heated air stream 214 separate from moist air stream 220 also reduces the vapor pressure of the air used to regenerate desiccant wheel 140. A lower vapor pressure facilitates drying within pellets 144. Heating element 212 heats air stream 206 sucked into dryer 200 from the room or outside, and does not use moist air stream 220. The hot air dries the pellets within desiccant wheel 140, as opposed to moist air such as that from air stream 220. Thus, the ggp of water will be reduced in air streams flowing into drum 104 because the water removal capabilities of desiccant wheel 140 are improved using heated air stream 214.

For example, the gpps used in the embodiment disclosed by FIG. 1 may be around 150-200 gpp. Using the configuration disclosed by FIG. 2 may result in using only 40-90 gpp to regenerate the pellets or applicable desiccant materials. Thus, the embodiments disclosed by FIG. 2 may result in substantial savings in terms of energy needed to keep desiccant wheel removing water from the outside air efficiently. The embodiments disclosed by FIG. 2, therefore, reduce drying time and the energy needed to dry article 102 by using the configuration shown.

Figure 3:
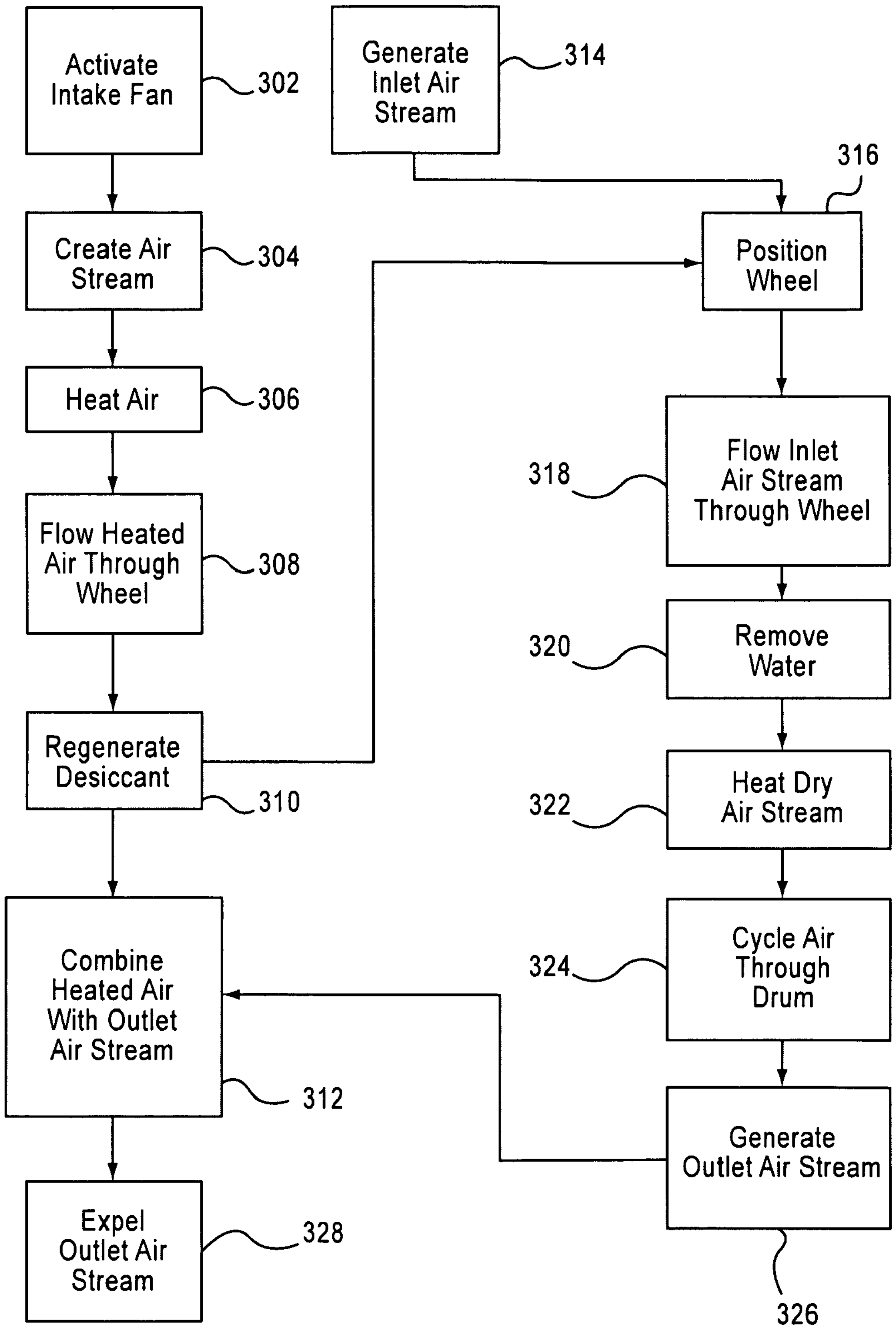
FIG. 3 illustrates a flowchart for drying an article according to the disclosed embodiments.

FIG. 3 depicts a flowchart for drying an article in a dryer according to the disclosed embodiments. The flowchart shows steps on drying an article using an intake air stream from outside the building housing the dryer and another air stream taken from the room or vicinity of the dryer. Reference is made to features of FIG. 2 where appropriate.

Step 302 executes by activating intake fan 210 to suck in air through intake 202. Step 304 executes by creating intake air stream 206 from the air sucked into dryer 200. As disclosed above, air stream 206 preferably comes from air in the vicinity of dryer 200. Step 306 executes by heating air stream 206.

Step 308 executes by flowing the heated air from into desiccant wheel 140, as shown by air stream 214. Step 310 executes by regenerating the desiccant in wheel 140 using the hot air to remove moisture and water molecules. Because air stream 214 is hot, dry air, the water removal properties are greater than using outlet air stream 220. Following step 310, step 316 may execute, as disclosed in greater detail below. Step 312 executes by combining the air stream flowing from wheel 140 into outlet air stream 220 such that all the moist air is taken away from drum 104 and wheel 140.

Steps 314-26 disclose the general drying process for dryer 200. These steps may execute in conjunction with steps 302-12 such that dryer 200 does not wait on either group of steps before executing the other. Further, both groups of steps may execute concurrently.

Step 314 executes by generating air within inlet air path 150 from outside the structure housing dryer 200. Preferably, the air stream within inlet air path 150 includes air from outside a house. Step 316 executes by positioning desiccant wheel 140 with desiccant best ready to absorb water molecules from the air flowing through wheel 140. Wheel 140 may be moved according to a set time period, such as every 5 seconds, or upon instruction from dryer 200. Thus, once the desiccant in wheel 140 is dried out, or regenerated, that portion of wheel 140 moves into alignment with inlet air path 150. As disclosed above, wheel 140 may be moved by instruction, a sensor reading indicating conditions desire wheel 140 to be moved, or according to a time period.

Step 318 executes by flowing air from inlet air path 150 through desiccant wheel 140. Water molecules, or grains of water in the air, are removed by the materials in desiccant wheel 140. Thus, step 320 executes by removing water from inlet air path 150 to generate dry air stream 230. Step 322 executes by heating dry air stream 230 and generating heated air stream 232. Because of the low water vapor provides better conditions for drying articles, such as clothes, the present configuration of the disclosed embodiments improves drying efficiency.

Step 324 executes by cycling the air from heated air stream 232 through drum 104. The air mixes and interacts with article 102 to remove moisture and water. Once the air is heavy with moisture, outlet air stream 220 is generated in step 326. Outlet air stream 220 includes debris, moisture and air from drum 104. Step 326 returns control of the flowchart to step 312 to combine the two outlet air flows shown in FIG. 2. Step 328 executes by expelling the combined air from dryer 200.

Thus, the disclosed embodiments of the present invention includes a dryer having different configurations to enhance moisture removal from incoming air. The disclosed embodiments include a wheel having a desiccant that rotates to different positions so that different portions of the wheel in the path of incoming and outgoing air. Further, the disclosed embodiments take advantage of the existing heating element in a dryer to enhance the incoming air and lower vapor pressure.

The disclosed embodiments are preferably used in open system dryers that have air brought in from outside the dryer. Thus, the air from the environment surrounding the dryer may include saturated or air having a high vapor pressure. The disclosed embodiments help to lower the vapor pressure of the incoming air using the wheel and its desiccant. Thus, no matter what the air is like outside of the dryer, the disclosed embodiments can lower the vapor pressure to a specified, acceptable level. This level is maintained because the desiccant material within the wheel is dried out by a separate air stream, or the drying ability of the desiccant material is regenerated.

The disclosed embodiments also are applicable to other drying processes beyond contemporary dryers. For example, a desiccant wheel may be set up to dry out a room or enclosed space of a building having severe moisture damage. Air is pumped, or forced, through an upper portion of the wheel prior to entering the room so as to lower the vapor pressure of the air within the room. Air also is forced out of the room to remove moisture or water that has evaporated within the room to an outside environment. Much like the outgoing air path disclosed above, this outgoing air serves to transfer heat or energy to the wheel and to regenerate the moisture removal capabilities of the wheel.

The disclosed embodiments of the present invention, however, are applicable to dryers in a household or laundry setting, where air is drawn from and returned to the outside environment. The present invention, however, is not limited to these dryers and may be applicable to any situation where an article needs to be dried using forced air. The air is heated and the moisture removed by the desiccant wheel. The vapor pressure of the incoming air is lowered to enhance moisture removal.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A method for drying an article located in a dryer, the method comprising:

creating an intake air stream to draw in outside air separate from an inlet air path, wherein the inlet air path flows from an outside source;

flowing outside air in the inlet air path through a wheel including desiccant material;

removing at least one water molecule from the air within the inlet air path with the desiccant material to generate a dry air stream;

heating the air in the dry air stream from the desiccant using a primary heater;

flowing the heated air in the inlet air path into a drum;

heating air within the intake air stream using a secondary heater; and flowing the heated air from the intake air stream through the wheel including desiccant material, wherein the inlet air path flows in an opposite direction to the intake air stream.

2. The method of claim 1, further comprising generating an outlet air stream from the drum holding the article, wherein the outlet air stream includes moist air from the inlet air path.

3. The method of claim 2, further comprising combining the heated air flowing through the wheel and the moist air from the outlet air stream in an outlet air path.

4. The method of claim 1, further comprising changing a position of the wheel within the inlet air path.

5. The method of claim 4, wherein the changing step includes moving a portion of the wheel receiving the heated air from the intake air stream to a position to receive the inlet air path.

6. The method of claim 1, further comprising pulling in the outside air into the intake air stream with a fan.

7. The method of claim 1, wherein the heating step comprises using a secondary heater located in the intake air stream.

8. The method of claim 1, further comprising moving the wheel such that about 50 to 80 percent of the desiccant receives the inlet air path.

9. A method for drying an article in an open drying system, the method comprising:

creating an intake air stream using air outside the open drying system;

heating air within the intake air stream;

flowing the heated air within the intake air stream through a first portion of a desiccant wheel, wherein the heated air regenerates desiccant within the desiccant wheel;

generating an inlet air stream that flows air from outside the open drying system through a second portion of the desiccant wheel;

heating the air from the inlet air stream using a primary heater after leaving the second portion of the desiccant wheel;

cycling the heated air from the inlet air stream through a drum holding the article;

expelling moist air flowing from the drum and the heated air from the intake air stream together through a vent.

10. The method of claim 9, further comprising activating an intake fan to create the intake air stream.

11. The method of claim 9, wherein the first heating step comprises using a secondary heater located in the intake air stream.

12. The method of claim 9, further comprising moving the desiccant wheel such that the second portion comprises about 50 to 80 percent of an area of the desiccant wheel.

* * * * *